2,889,308

RESINOUS MIXTURES CONTAINING VINYL CHLORIDE-OCTYL ACRYLATE INTERPOLYMERS AND ACRYLONITRILE-STYRENE COPOLYMERS

Harry A. Fedderson, Metuchen, N.J., assignor to Union Carbide Corporation, a corporation of New York No Drawing. Application July 17, 1956
Serial No. 598,258

2 Claims. (Cl. 260—45.5)

This invention relates to resinous mixtures containing vinyl chloride-octyl acrylate interpolymers and to articles of manufacture prepared from such mixtures. More particularly, the present invention relates to resinous mixtures comprising a vinyl chloride-octyl acrylate interpolymer and a styrene-acrylonitrile copolymer.

The resinous mixtures of the present invention can be compounded, formed and fabricated by any of the methods generally used with thermoplastic materials. They can be made into plastic articles which possess greatly improved impact strength at virtually every level of rigidity, with little or no sacrifice in other major properties. Plastic articles made from these mixtures also possess better surface characteristics, which result in improved appearance. They also are much more easily processed, can be extruded more readily over a wider range of temperatures and extrusion rates, can be calendered to greater thicknesses, vacuum formed into thinner sections and to deeper draws, and can generally be formed and fabricated with greater ease and economy than conventional thermoplastic materials.

Thermoplastic materials possessing a combination of high impact strength, high heat distortion temperature and adequate rigidity are required for many fields of application, such as in the fabrication of hoods, ducts, tanks, decorative and construction panels of many sorts, for pipe, doll faces, drafting instruments, for the production of vacuum-formed items such as advertising displays, novelties, skin-packages, and the like and for such uses as rigid, thin-walled, low cost containers which must withstand shipping and handling abuse. There are many additional applications in which some sacrifice in rigidity can be tolerated to gain very high impact strength.

In general, currently known materials do not combine all of the above-mentioned properties to an adequate degree. For example, polyvinyl chloride (PVC) compositions, which provide acceptable levels of rigidity and impact for certain applications, have an unacceptably low heat distortion temperature (about 68–70° C.). On the other hand, styrene-acrylonitrile copolymers, which have a higher heat distortion temperature (about 20° C. higher than PVC) possess so low an impact strength that their utilization for many applications is precluded.

Certain properties, such as impact and rigidity, of binary mixtures of resins are generally intermediate between those of the individual resins entering into the mixture and are roughly proportionate to the relative amounts of the two resins present. For example, the increase in impact effected by introducing a soft, high impact resin is accompanied by an approximately proportionate decrease in rigidity. For this reason, only limited amounts of a modifying resin can be employed. Thus, only limited improvements in impact strength can be accomplished without reducing rigidity to an unacceptable level. In addition, the heat distortion temperature of such mixtures of resins is appreciably below that of the higher heat distortion resin and may, in some instances, even approach that of the lower heat distortion resin. For example, previous efforts to upgrade the impact strength of styrene-acrylonitrile copolymers, by combining them with a resin having high impact strength, have resulted in so great a reduction in heat distortion temperature that the resulting product has been unacceptable.

Vinyl chloride-octyl acrylate interpolymers range from very soft, essentially flexible products having very high impact strength and very low heat distortion temperature to fully rigid products having very low impact strength and moderately high heat distortion temperature, depending on whether the vinyl chloride content of the interpolymer is relatively low or high. However, despite the extremely broad ranges of stiffness, impact and heat distortion temperature possessed by these resins, no one member of the family possesses the desired high level of all of these properties simultaneously.

The compositions of this invention, which comprise mixtures of a vinyl chloride-octyl acrylate interpolymer and a styrene-acrylonitrile base resin, provide the following improvements over the known art:

(1) They possess greatly improved impact strength with only minor changes in other properties, as compared with the base resin.

(2) They possess superior processability, in that they can be processed satisfactorily over much broader temperature ranges than the base resins and they can be calendered to greater thicknesses. These benefits provide greater flexibility, ease and economy in production.

(3) They provide improved appearance. The surface of sheets prepared from them, to which either gloss or matte finishes have been applied by conventional means, are appreciably more uniform in appearance and free of any undesirable roughness and of minor thickness deviations which are frequently experienced with conventional thermoplastics. This improvement is particularly striking in colored compositions.

The compositions of the present invention comprise mixtures of from about 5 to about 55 parts by weight and preferably from about 15 to about 45 parts of vinyl chlorideoctyl acrylate interpolymer and from about 45 to 95 parts and preferably from 55 to 85 parts of a styrene-acrylonitrile copolymer (also referred to herein as SAC).

The styrene-acrylonitrile copolymer (also referred to in this specification as the "base resin") preferably contains from about 20 to about 35 percent acrylonitrile. At acrylonitrile contents above about 35 percent, the copolymers become discolored and their heat stability becomes so poor that they cannot be compounded or formed without a prohibitive amount of degradation. At acrylonitrile contents below about 20 percent, the copolymers are undesirably brittle. The most preferred acrylonitrile content is from about 25 to about 30 percent by weight.

The vinyl chloride-octyl acrylate interpolymers contemplated herein may contain from about 60 to about 86 parts vinyl chloride and 14–40 parts octyl acrylate, such as ethylhexyl acrylate, n-octyl acrylate or methylheptyl acrylate, and preferably contain from about 70 to about 86 parts vinyl chloride. They may be prepared as follows: A mixture comprising from 1.5 to 9 parts by weight of vinyl chloride and one part of octyl acrylate is reacted at a temperature of from about 10° C. to about 80° C., and preferably from 35° C. to 50° C., under autogenous pressure until at least sixty per cent and preferably until about 70 percent of the monomeric mixture of vinyl chloride and alkyl acrylate is converted to polymeric material.

The mixture of monomers may be polymerized in bulk, without solvent or diluent, employing a suitable organic-soluble catalyst such as azo-bis-diisobutyronitrile, benzoyl peroxide, diacetyl peroxide, or lauroyl peroxide. Such a mixture loses its fluidity before the desired minimum conversion of 60 percent is reached, but the resulting gummy, horny or powdery polymer may be dissolved in a suitable solvent such as acetone, and then precipitated, with good agitation, by addition of water, methanol, or other suitable alcohol, in order to convert it to a desirable physical form.

A preferred method of polymerizing the mixture of monomers comprises dissolving a catalyst therein and dispersing the resulting mixture in water, either by mechanical agitation alone or with the aid of both mechanical agitation and a suspending agent such as polyvinyl alcohol, hydroxyethyl cellulose, carboxymethyl cellulose, or the sodium salt of styrene-maleic anhydride copolymer. The polymerization is then allowed to continue until a conversion to polymer of at least 60 percent is attained. The product is a slurry of polymer particles in water, which particles may readily be separated from the water by filtering or centrifuging, and readily washed free of suspending agent and catalyst by reslurrying in clean water.

Emulsifying agents such as sodium dioctyl sulfosuccinate, sodium lauryl sulfosuccinate, or sodium tetradecylsulfate, in concentrations of from 0.5 to 2 percent by weight of total monomer initially present, may be substituted for the suspending agents listed for suspension polymerization, and the polymerization reaction carried out as an emulsion process. Preferred catalysts for emulsion polymerization are the water-soluble peroxy compounds such as potassium persulfate, ammonium persulfate and hydrogen peroxide, and also catalysts such as the combination potassium persulfate-sodium bisulfate. The resulting product, after the polymerization reaction is allowed to continue to a minimum of 60 percent conversion of monomer to polymer, is a latex of finely divided polymer particles in water. The polymer may be recovered from this latex by adding to the latex a small concentration (0.1 percent to 1.0 percent) of an electrolyte such as calcium chloride, or by diluting the latex with approximately an equal volume of isopropanol or other water-miscible organic solvent. The latex is converted into a slurry of polymer particles in water, which may be handled in a manner identical with the slurry produced by the suspension polymerization process.

The suspension and emulsion processes described amove may be carried out either in conventional stirred pressure-tight vessels or in continuous tubes maintained at the desired polymerization temperature. These processes are particularly suitable for continuous polymerization in a tube reactor, since the polymerization mixture in either case remains fluid even up to a point of total conversion of monomer to polymer, and since it is not necessary to add additional monomer to the polymerization mixture during the course of the polymerization reaction. It should be noted, however, that continuous polymerization techniques will produce the desired results only if carried out in such a way that each increment of the polymerization mixture is permitted to polymerize to high conversion without admixture of additional alkyl acrylate monomer.

The following examples are illustrative of the preparation of vinyl chloride-octyl acrylate resins useful in the present invention.

EXAMPLE I

To a pressure vessel equipped with means for stirring were charged the following: 78 parts (by weight) of vinyl chloride, 22 parts of 2-ethylhexyl acrylate, 235 parts of demineralized water, 1 part of Orvus paste (a sodium salt of technical lauryl sulfate), 0.5 part of "Tergitol 4" (a sodium sulfate derivative of 7-ethyl-2-methyl-undecanol-4), 0.1 part of tertiary dodecyl mercaptan, 0.025 part of potassium persulfate and 0.004 part of sodium bisulfate. This mixture was then stirred under autogenous pressure at a temperature of 48° C. for 13½ hours. The resulting latex was coagulated by adding calcium chloride. The coagulated resin was then filtered, washed with water and dried in a circulating-air oven. A final conversion of 92 percent was attained. The polymer contained 74.6 percent vinyl chloride by analysis and had a specific viscosity of 0.28.

EXAMPLE II

To a pressure vessel equipped with means for stirring were charged the following: 75 parts (by weight) of vinyl chloride, 25 parts of 2-ethylhexyl acrylate, 235 parts of demineralized water, 1 part of Orvus paste (a sodium salt of technical lauryl sulfate), 0.5 part of "Tergitol 4" (a sodium sulfate derivative of 7-ethyl-2-methyl-undecanol-4), 0.1 part of tertiary dodecyl mercaptan, 0.025 part of potassium persulfate and 0.004 part of sodium bisulfate. This mixture was then stirred under autogenous pressure at a temperature of 40° C., for 18½ hours. The resulting latex was coagulated by adding isopropanol. The coagulated resin was then filtered, washed with water and dried in a circulating-air oven. A final conversion of 95 percent was attained. The polymer contained 74.5 percent vinyl chloride by analysis and had a specific viscosity of 0.33.

EXAMPLE III

To a pressure vessel equipped with means for stirring were charged the following: 81 parts (by weight) of vinyl chloride, 19 parts of 2-ethylhexyl acrylate, 235 parts of demineralized water, 1 part of Orvus paste (a sodium salt of technical lauryl sulfate) 0.5 part of "Tergitol 4" (a sodium sulfate derivative of 7-ethyl-2-methyl-undecanol-4), 0.1 part of tertiary dodecyl mercaptan, 0.025 part of potassium persulfate and 0.004 part of sodium bisulfate. This mixture was then stirred under autogenous pressure at a temperature of 40° C. for 16 hours. The resulting latex was coagulated by adding isopropanol. The coagulated resin was then filtered, washed with water and dried in a circulating-air oven. A final conversion of 93 percent was attained. The polymer contained 80.8 percent vinyl chloride by analysis and had a specific viscosity of 0.33.

EXAMPLE IV

To a pressure vessel equipped with means for stirring were charged the following: 70 parts (by weight) of vinyl chloride, 30 parts of 2-ethylhexyl acrylate, 235 parts of demineralized water, 1 part of Orvus paste (a sodium salt of technical lauryl sulfate), 0.5 part of "Tergitol 4" (a sodium sulfate derivative of 7-ethyl-2-methyl-undecanol-4), 0.1 part of tertiary dodecyl mercaptan, 0.025 part of potassium persulfate and 0.004 part of sodium bisulfate. This mixture was then stirred under autogenous pressure at a temperature of 40° C. for 21 hours. The resulting latex was coagulated by adding isopropanol. The coagulated resin was then filtered, washed with water and dried in a circulating-air oven. A final conversion of 98 percent was attained. The polymer contained 69.0 percent vinyl chloride by analysis and had a specific viscosity of 0.25.

EXAMPLE V

To a pressure vessel equipped with means for stirring were charged the following: 86 parts (by weight) of vinyl chloride, 14 parts of 2-ethylhexyl acrylate, 235 parts of demineralized water, 1 part of Orvus paste (a sodium salt of technical lauryl sulfate), 0.5 part of "Tergitol 4" (a sodium sulfate derivative of 7-ethyl-2-methyl-undecanol-4), 0.1 part of tertiary dodecyl mercaptan, 0.025 part of potassium persulfate and 0.004 part of sodium bisulfate. This mixture was then stirred under autogenous pressure at a temperature of 40° C. for 16 hours. The resulting latex was coagulated by adding isopropanol. The coagulated resin was then filtered, washed with water and dried in a circulating-air oven. A final conversion of 99 percent was attained. The polymer contained 84.3 percent vinyl chloride by analysis and had a specific viscosity of 0.32.

EXAMPLE VI

To a pressure vessel equipped with means for stirring were charged the following: 86 parts (by weight) of vinyl chloride, 14 parts of 2-ethylhexyl acrylate, 235 parts of demineralized water, 1 part of Orvus paste (a sodium salt of technical lauryl sulfate), 0.5 part of "Tergitol 4" (a sodium sulfate derivative of 7-ethyl-2-methyl-undecanol-4), 0.1 part of tertiary dodecyl mercaptan, 0.025 part of potassium persulfate and 0.004 part of sodium bisulfate. This mixture was then stirred under autogenous pressure at a temperature of 40° C. for 22½ hours. The resulting latex was coagulated by adding isopropanol. The coagulated resin was then filtered, washed with water and dried in a circulating-air oven. A final conversion of 95 percent was attained. The polymer contained 84.6 percent vinyl chloride by analysis and had a specific viscosity of 0.14.

EXAMPLE VII

To a pressure vessel equipped with means for stirring were charged the following: 84 parts (by weight) of vinyl chloride, 16 parts of 2-ethylhexyl acrylate, 235 parts of demineralized water, 1 part of Orvus paste (a sodium salt of technical lauryl sulfate), 0.5 part of "Tergitol 4" (a sodium sulfate derivative of 7-ethyl-2-methyl-undecanol-4), 0.1 part of tertiary dodecyl mercaptan, 0.025 part of potassium persulfate and 0.004 part of sodium bisulfate. This mixture was then stired under autogenous pressure at a temperature of 40° C. for 16 hours. The resulting latex was coagulated by adding calcium chloride. The coagulated resin was then filtered, washed with water and dried in a circulating-air oven. A final conversion of 80–85 percent was attained. The polymer contained 80 percent vinyl chloride by analysis and had a specific viscosity of 0.28.

EXAMPLE VIII

About 84 parts of vinyl chloride and 16 parts of 2-ethylhexyl acrylate were charged to a mixture consisting of 150 parts of water, 0.5 part of lauroyl peroxide, 0.22 part of "cellosize" hydroxyethyl cellulose, 0.01 part of tertiary dodecyl mercaptan in an autoclave equipped with stirring means. The reaction was conducted at 45° C. and a final conversion of 80–85 percent was obtained in about 20 hours. The polymer contained 80 percent vinyl chloride by analysis and had a specific viscosity of 0.28.

The novel compositions of the present invention may be prepared by any of the methods generally employed to mix and compound thermoplastic resins, such as with ribbon or paddle type blenders, Banbury mixers, roll mills and the like, provided satisfactory mixing is achieved. Generally, the greater the homogeneity, the better the properties, particularly impact strength, provided by a given composition. Heat distortion temperature is also generally favored by greater homogeneity; but may, in some instances, fall below the optimum of which a given resin mixture is capable if the composition is exposed for too long a period or subjected to too much mechanical work at elevated temperatures. However, this tendency can usually be minimized or even offset completely by appropriate choice of resin stabilizers.

It has been found that good mixing is most readily accomplished when the fluxing and plasticity characteristics of the base resin and vinyl chloride-octyl acrylate interpolymer are most nearly alike. Large differences in said characteristics militate against good mixing in the following manner. If the fluxing temperatures of the two resins differ significantly and/or the resins possess widely divergent plasticities at the compounding temperature, the stiffer resin remains incompletely fluxed—or, at best, relatively immobile—and does not become adequately dispersed throughout the mass. The specific viscosity of the vinyl chloride-octyl acrylate interpolymer used does not, in itself, exercise any great effect on the properties of the final product, provided satisfactory homogeneity is achieved. However, considered in combination with resin composition, it is useful as a preliminary guide to the vinyl chloride-octyl acrylate interpolymer's process behaviors. This and the effect on properties of mixing inequalities caused by differences in the process characteristics of the base resin and vinyl chloride-octyl acrylate interpolymer may be illustrated by reference to Examples D1 through D4 of Table I, which appears at a later point in this specification.

Examples D1, D2, D3 and D4 are based on substantially the same vinyl chloride-octyl acrylate interpolymer: base resin ratio, and the vinyl chloride-octyl acrylate interpolymers used therein are similar in composition. However, the products of D1 and D2 withstand only about half as severe an impact blow (9–11 ft./sec.) as do those of D3 and D4 (19 ft./sec.). The lower specific viscosity vinyl chloride-octyl acrylate interpolymers used in D1 and D2 were perceptibly softer and had materially lower fluxing temperatures than the base resin (SAC); whereas the higher specific viscosity vinyl chloride-octyl acrylate interpolymers used in D3 and D4 were more similar to the SAC in these respects, hence compounded more readily therewith under the particular processing conditions employed in these examples.

Differences in resin process characteristics can be handled in several ways. For example, the two resins can be fluxed together using compounding temperatures and mixing equipment which insure complete fluxing and satisfactory mobility of the stiffer resin. Alternatively, the two resins can be fluxed separately. In a preferred method of achieving satisfactory mixing of styrene-acrylonitrile copolymers and vinyl chloride-octyl acrylate interpolymers of disparate rheological characteristics, the stiffer resin is fluxed first, e.g., on a two-roll mill, and the softer resin is then added and mixed thoroughly therewith.

Modifiers such as dyes, pigments, stabilizers, lubricants, slip agents, processing aids, densifiers, opacifiers, fillers, extenders and the like may be incorporated in any of several ways, depending on their nature and the particular resins involved. They may be incorporated separately into the initial mixture or premixed with one of the resins, or some may be premixed with one and some with the other resin, or they may be premixed—either together or separately—with a portion of either resin or of a mixture of both resins.

Modifiers of many sorts are frequently included in thermoplastic resin compositions to promote certain properties or processing characteristics. These include fatty acids, e.g., stearic acid, palmitic acid, lauric acid and salts of such acids; vegetable and mineral oils, e.g., castor oil, refined petroleum oils; natural and synthetic waxes, e.g., paraffins, microcrystalline waxes, selected polymers of ethylene, isobutylene; acid acceptors, e.g., basic carbonate of white lead, dibasic lead stearate, dibasic lead phosphite, organo-tin mercaptides, epoxy compounds; esters of phosphoric, phthalic, adipic, sebacic and other acids and various polyesters; salicyclates; dyes; pigments; alkaline earth metal carbonates; silicates; clays; carbons; and the like which function as colorants, stabilizers, anti-oxidants, lubricants, slip agents, processing aids, densifiers, opacifiers, fillers, and extenders. Such modifiers may also be used in combination with the resin mixtures of this invention. It has been found that a modifier which is customarily used with a particular thermoplastic resin generally has the same qualitative effects on the behaviors of a mixed-resin composition comprising said resin as one component of the resin mixture. In this respect, I have found that generally the same modifiers known to be effective for vinyl chloride polymers and copolymers are also effective for vinyl chloride-octyl acrylate interpolymers.

The following examples are illustrative. For convenience, the examples have been set forth in a table which is described below.

All of the examples listed in the table were prepared as follows:

| Formulation (parts by weight) | D | D1, D2, and D3 | D4 |
|---|---|---|---|
| SAC resin [1] | 100 | 72.375 | 71.25 |
| Vinyl chloride-octyl acrylate interpolymer shown in Table I | 0 | 25 | 25 |
| Epoxidized soy bean oil | 0 | 1.5 | 0 |
| Coprecipitated 60:40 barium-cadmium laurates mixture | 0 | 0.75 | 1.5 |
| Trioctyl phosphite | 0 | 0.375 | 0.75 |
| "Advastab E-49" [2] | 0 | 0 | 1.5 |

[1] The resin designated as SAC is a styrene-acrylonitrile copolymer containing about 72 percent styrene and having a specific viscosity of 0.18 (measured at 25° C. on a methyl ethyl ketone solution containing 0.2 g. resin/100 ml. of solution).
[2] "Advastab E-49" is an epoxy type stabilizer made by Advance Solvents and Chemicals Corp.

*Compounding procedure.*—The components were mechanically mixed in a paddle type blender for ten minutes. The blend was then fluxed and thoroughly mixed by working it for two minutes in an unheated, size 00 Banbury mixer then passing it five times between the rolls of an 8″ x 16″ two-roll mill, and calendered into 10 mil thick sheet on a four-roll, inverted-L type calendar with 8″ x 16″ rolls. The mill and calender roll temperatures used are shown in Table I and in the notes to Table I.

*Table I*

| Ex. No. | Resin | | | | 2 roll mill temp. (° C.) | Impact velocity (ft./sec.) | Heat distortion temp. (° C.) |
|---|---|---|---|---|---|---|---|
| | Base resin | Vinyl chloride-octyl acrylate interpolymer | | | | | |
| | | Grade | Specific viscosity [a] | Percent conc. in resin mixture | | | |
| D | SAC | | | 0 | 175 | [b]<4 | 89 |
| D1 | SAC | 74.7 | 0.19 | 25.7 | 170 | 11 | 82 |
| D2 | SAC | 79.9 | 0.28 | 25.7 | 170 | 9 | 85 |
| D3 | SAC | 76.4 | 0.40 | 25.7 | 170 | 19 | 79 |
| D4 | SAC | 76.3 | 0.52 | 26.0 | 170 | 19 | 79 |

[a] Specific viscosity equals $(n-n_0)/n_0$, where $n_0$ and $n$ are the viscosities at 20° C. of cyclohexanone and of a solution containing 0.2 gram resin per 100 milliliters of cyclohexanone, respectively.
[b] The test apparatus used was incapable of measuring values below 4.

NOTES TO TABLE I (1) *Compounding and calendering temperatures.*—The calender roll temperatures used for each composition were as follows: offset roll . . . 5° C. higher than temperature of 2-roll mill shown in Table I; top roll . . . 5° C. lower than top roll; and bottom roll . . . 5° C. lower than middle roll.
(2) *Test methods.*—Impact velocity was measured on 0.010″ thick specimens by the method described by C. S. Myers in Modern Plastics 20, 81–87 and 116–118 (October 1942); and heat distortion temperature by the method of ASTM–D–648–45T.

It has been found advisable to include stabilizers in vinyl chloride-octyl acrylate interpolymer comprising compositions, since unstabilized vinyl chloride-octyl acrylate interpolymers are vulnerable to undesirable changes at the high temperatures used to provide good mixing and forming. The styrene-acrylonitrile copolymers of the type used in Examples D–D4, on the other hand, are generally sufficiently resistant to degradation during hot processing operations to make such stabilizers unnecessary. Consequently, no stabilizers were included in the composition of Example D in which the only resin present was the styrene-acrylonitrile copolymer. Amounts sufficient to protect the vinyl chloride-octyl acrylate interpolymer were included in the compositions of Examples D1–D4.

The term grade, as used herein describes the vinyl chloride content of the vinyl chloride-octyl acrylate interpolymer. For example, such an interpolymer containing 75 percent vinyl chloride would be designated as a 75 percent grade vinyl chloride-octyl acrylate interpolymer or, more simply, as a 75 percent grade interpolymer. Each of the vinyl chloride-octyl acrylate interpolymers used in Examples D1–D4 was a soft, i.e. non-rigid, resin possessing high impact strength. Furthermore, each of said interpolymers had a heat distortion temperature ranging from less than 40 to at most 57° C.

It can be seen from the foregoing that the compositions of this invention combine, to a high degree, the best features of the base resin and vinyl chloride-octyl acrylate interpolymer and are relatively free of the chief limitations of the individual resins.

By virtue of their unique property combinations, the new compositions are suitable for end-uses hitherto closed to thermoplastic materials. For instance, polyvinyl chloride resin compounds are unsuitable, because of their relatively low heat distortion temperature (about 68–70° C.), for the fabrication of certain chemical tanks and for other applications in which the plastic section must sustain stresses at elevated operating temperatures. Styrene-acrylonitrile copolymers which would meet the temperature requirement because of their higher heat distortion temperature (about 90° C.) are too brittle for such uses; and all previously contemplated methods of improving their impact strength have prohibitively reduced their heat distortion temperature. The SAC/vinyl chloride-octyl acrylate interpolymer mixtures of this invention, on the other hand, provide vastly improved impact strength in combination with heat distortion temperatures which are significantly higher than that of polyvinyl chloride. Moreover, their heat distortion temperatures can be improved still further by appropriate choice of stabilizers and processing technique.

During the calendering operations, Cameron knives positioned between the last calender roll and the windup, were used to trim the calendered sheet edges before said sheet was picked up on the windup. (A Cameron knife consists, in essence, of a rotating wheel slitter and a hard metal slitter-backup roll). Composition D shattered continuously along the edges being trimmed; whereas compositions D1 through D4 exhibited no such shattering. This behavior reflects the reduced brittleness of the new materials, that is, their greater toughness and impact strength. These improvements not only provide a very significant process superiority during the calendering operation, but also significantly increase the ability of cold sheets to withstand trimming, cutting and stampout operations such as are frequently involved in subsequent forming and fabricating procedures.

The novel compositions may be prepared by any of the methods generally employed to mix and compound thermoplastic resins, such as with ribbon or paddle type blenders, Banbury mixes, roll mills and the like, provided satisfactory mixing is achieved. Generally, the greater the homogeneity, the better the properties, particularly impact strength, provided by a given composition. Heat distortion temperature is also generally favored by greater homogeneity; but may, as in some instances, fall below the optimum of which a given resin mixture is capable if the composition is exposed for too long a period or subjected to too much mechanical work at elevated temperatures. However, this tendency can usually be minimized or even offset completely by appropriate choice of resin stabilizers.

A preferred method of mixing the styrene-acrylonitrile copolymer with the vinyl chloride-octyl acrylate interpolymer is to flux the stiffer resin first, for example on a two-roll mill, and then to add the softer resin. This is illustrated by the following examples.

EXAMPLE F2

A mixture consisting of 25 parts of a 79.9 percent grade vinyl chloride-octyl acrylate resin having a specific viscosity of 0.22, 2 parts of epoxidized soy bean oil, one part of 60:40 mixture of coprecipitated barium and cadmium laurates and 0.5 part trioctyl phosphite was blended together and set aside. 71.5 parts of SAC (the same resin used in Examples D through D4) was fluxed in a Banbury mixer then transferred to a 170° C. two-roll mill and banded around one roll. The vinyl chloride-octyl acrylate resin-stabilizer bend was then added to the plastic mass on the mill and blended into the mass by rolling it about two more minutes, then removing the sheet from the mill and passing it five times between the mill rolls. The composition was then calendered into 10 mil thick sheets substantially as described in the previous example. The properties of the product so obtained are compared with those of the product of Example D2 below.

|  | Impact velocity (ft./sec.) | Heat distortion temperature (° C.) |
|---|---|---|
| D2 | 9 | 85 |
| F2 | 22 | 82 |

EXAMPLE F4

A formulation identical with that used in Example D4 was processed in the following manner. The styrene-acrylonitrile copolymer (SAC) was held separate. The remaining components, i.e., the vinyl chloride-octyl acrylate resin and stabilizers, were blended and the blend was fluxed on a 170° C. two-roll mill and banded around one of the rolls. The SAC was added to the plastic mass on the mill and the composition mixed and calendered as described in Example F2.

EXAMPLE F5

61.25 parts SAC, 35 parts of the same 76.3 percent grade vinyl chloride-octyl acrylate resin used in Examples D4 and F4, 1.5 parts 60:40 mixture of coprecipitated barium and cadmium laurates, 0.75 part trioctyl phosphite and 1.5 parts Advastab E-49 (an epoxy type stabilizer) were compounded together and calendered into 10 mil thick sheet in the same manner as the composition of the preceding example. The properties of the product so obtained and of the products of Examples F4 and D4 are shown below.

|  | Impact velocity (ft./sec.) | Heat distortion temperature (° C.) |
|---|---|---|
| D4 | 19 | 79 |
| F4 | 18 | 85 |
| F5 | ¹ Over 50 | 76 |

¹ I.e., went off the scale of the test apparatus which was capable of measuring values up to about 50.

EXAMPLE F6

Two mixtures consisting of: (A) 72 parts SAC, 25 parts of the same 76.3 percent grade vinylchloride-octyl acrylate resin used in D4, F4, and F5, 2 parts barium epoxystearate and one part cadmium epoxystearate; and (B) 47 parts SAC, 50 parts of the same vinyl chloride-octyl acrylate resin used in (A), 2 parts barium epoxystearate and one part cadmium epoxystearate were processed as follows. The entire mixture was blended. The blend was fluxed and sheeted on a 160° C. two-roll mill, rolled for about two more minutes, then given five end-passes through the roll bight. The compounds were then calendered and tested with the following results.

|  | Impact velocity (ft./sec.) | Heat distortion temperature (° C.) |
|---|---|---|
| (A) | 9 | 89 |
| (B) | Over 50 | 67 |

The compositions of my invention are also useful in multiple ply sections of many sorts. For instance, there are end applications such as the fabrication of certain chemical tanks, containers, hoods, ducts, etc. for which anything less than the excellent resistance to chemical and atmospheric corrosion of styrene-acrylonitrile copolymers or the resistance of some other particular resin to a specific corroding agent cannot be tolerated but for which said materials do not provide adequate impact strength. A thin surface ply of styrene-acrylonitrile copolymer or other chemically resistant resin can be applied to sheets of the composition of the present invention either by laminating a thin film of said resin thereto or by surface coating methods, to provide a combination of high impact strength, good chemical resistance and good heat distortion temperature not otherwise possible to obtain.

The compositions of this invention can be extruded into films, rods, tubes, pipe and various other profiles. Thin films have also been prepared, using said compositions, by calendering and casting from solution. The compositions can be compression and injection molded or otherwise formed and finished by any of the fabrication methods generally employed for thermoplastic materials. In each of these instances they provide the advantages previously enumerated, i.e., improved toughness and heat distortion temperature, better processability, improved surface and better appearance.

The viscosity of the vinyl chloride-octyl acrylate interpolymer has an effect upon the properties of the mixture only to the extent that it affects the ease with which a homogeneous mixture is obtained. In other words, two mixtures differing only with respect to the viscosity of the vinyl chloride-octyl acrylate interpolymer contained therein will not, so long as they have been brought to comparable degrees of homogeneity by proper choice of processing techniques, differ significantly in properties.

All other things being equal (i.e., same base resin and same base resin to vinyl chloride-octyl acrylate interpolymer ratio), it has been found that (I) increasing the vinyl chloride to octyl acrylate ratio of the vinyl chloride-octyl acrylate interpolymer provides mixtures having greater rigidity but less impact strength; and conversely, (II) decreasing the vinyl chloride content of the vinyl chloride-octyl acrylate interpolymer provides mixtures having progressively greater impact strength but less rigidity.

In general, resin mixtures containing from 5 to 55 percent (by weight) of vinyl chloride-octyl acrylate interpolymer, i.e., from 0.05 to 1.2 parts vinyl chloride-octyl acrylate interpolymer per part base resin, are preferred. The best combination of impact strength, rigidity and heat distortion temperature has been obtained using from 20 to 45 percent of vinyl chloride-octyl acrylate interpolymer with from 55 to 80 percent of a styrene-acrylonitrile copolymer.

Vinyl chloride-octyl acrylate interpolymers containing from 60 to 86 percent vinyl chloride are useful in the mixtures of this invention, depending on the particular balance of properties desired. Those containing from 70 to 86 percent vinyl chloride are preferred when the impact/rigidity/heat distortion temperature balance is of paramount importance. In general, vinyl chloride-octyl acrylate copolymers containing less than 60 percent vinyl chloride do not confer adequate rigidity; and those containing over 86 percent vinyl chloride do not provide as much improvement in impact strength as can be attained with the 60 to 86 percent grades.

I claim:

1. A resinous mixture comprising from about 5 to about 55 parts of an interpolymer of from about 60 to about 86 percent by weight of vinyl chloride and the remainder octyl acrylate and from about 45 to about 95 parts of a copolymer of from about 20 to 35 percent by weight of acrylonitrile and the remainder styrene.

2. A formed plastic article having an impact velocity of at least 4 feet per second and comprised of a resinous mixture comprising from about 5 to about 55 parts of an interpolymer of from about 60 to about 86 percent by weight of vinyl chloride and the remainder octyl acrylate and from about 45 to about 95 parts of a copolymer of from about 20 to 35 percent by weight of acrylonitrile and the remainder styrene.

References Cited in the file of this patent

UNITED STATES PATENTS 2,646,417　　Jennings _____ July 21, 1953